(12) United States Patent
Lexmond et al.

(10) Patent No.: US 9,171,193 B1
(45) Date of Patent: Oct. 27, 2015

(54) SYSTEM AND METHOD FOR SETTING A REAL-TIME CLOCK OF A BARCODE READING DEVICE

(71) Applicant: The Code Corporation, Draper, UT (US)

(72) Inventors: Michiel Lexmond, De Bilt (NL); George Powell, Draper, UT (US)

(73) Assignee: The Code Corporation, Draper, UT (US)

( * ) Notice: Subject to any disclaimer, the term of this patent is extended or adjusted under 35 U.S.C. 154(b) by 0 days.

(21) Appl. No.: 14/572,551

(22) Filed: Dec. 16, 2014

(51) Int. Cl.
*G06F 17/00* (2006.01)
*G06K 7/10* (2006.01)
*G04G 99/00* (2010.01)

(52) U.S. Cl.
CPC ............ *G06K 7/10722* (2013.01); *G04G 99/00* (2013.01); *G06K 7/10821* (2013.01)

(58) Field of Classification Search
CPC . G06K 7/10881; G06K 7/14; G06K 17/0022; G06K 2207/1012; G06K 2207/1016; G06K 2207/1017; G06K 2207/1018; G06K 7/10; G06K 7/10564; G06K 7/10584; G06K 7/10594; G06K 7/10603; G06K 7/10663

USPC .......... 235/375, 380, 462.01–462.45, 472.01, 235/472.02, 472.03
See application file for complete search history.

(56) References Cited

U.S. PATENT DOCUMENTS

| | | | |
|---|---|---|---|
| 5,777,315 A * | 7/1998 | Wilz et al. ................ 235/462.15 |
| 6,321,989 B1 * | 11/2001 | Wilz et al. ................ 235/462.45 |
| 2004/0036774 A1 * | 2/2004 | Nichols et al. ............ 348/207.1 |
| 2006/0208083 A1 * | 9/2006 | Kotlarsky et al. ........ 235/462.01 |
| 2006/0218026 A1 * | 9/2006 | Osborne .......................... 705/8 |
| 2011/0284625 A1 * | 11/2011 | Smith et al. ................... 235/375 |
| 2013/0212420 A1 * | 8/2013 | Lawson et al. ................ 713/400 |
| 2014/0353382 A1 * | 12/2014 | Rambler .................. 235/462.13 |

* cited by examiner

*Primary Examiner* — Thien M Le
(74) *Attorney, Agent, or Firm* — Timothy P. O'Hagan; Austin Rapp & Hardman

(57) ABSTRACT

The present disclosure provides a system and method for setting the time for an internal clock function of a barcode reader and enabling the barcode reader to associate time, as determined by the internal clock function, with production barcodes read during operator use of the barcode reader and delivery of the combination of production barcodes and the associated time to a host system.

15 Claims, 4 Drawing Sheets

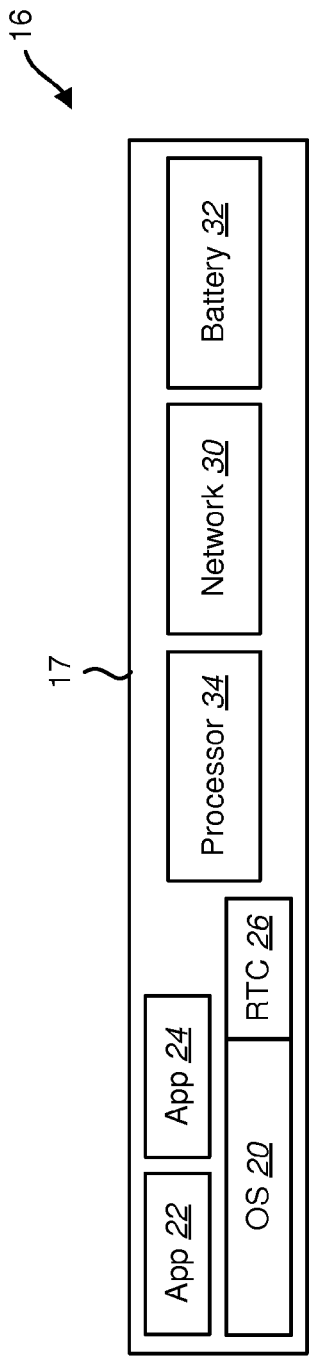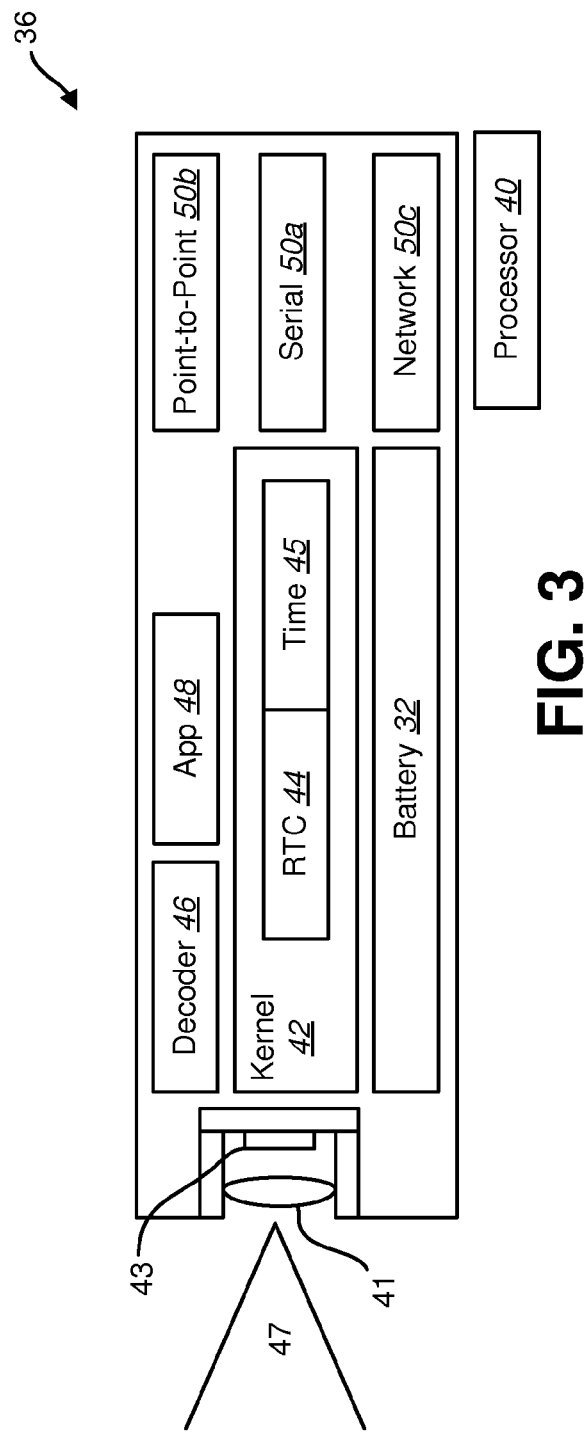

SYSTEM AND METHOD FOR SETTING A REAL-TIME CLOCK OF A BARCODE READING DEVICE

TECHNICAL FIELD

The present disclosure relates generally to barcode readers. More specifically, the present disclosure relates to barcode readers which include a real-time clock function.

BACKGROUND

A barcode is an optical machine-readable representation of information. Devices for identifying or extracting information from barcodes are generally referred to as barcode readers (or barcode scanners). An image-based barcode reader includes a focusing lens for focusing illumination reflected from a field of view of the barcode reader onto a photo sensor array to capture an image of a barcode within the field of view. Once an image of a barcode has been captured by the photo sensor array, a processor operating a decoder processes the image and extracts the information contained in the barcode.

Imaging barcode readers are useful in that they are generally capable of reading barcodes printed on a substrate and displayed electronically on a display screen. Generally, when reading a barcode printed on a substrate, the barcode reader utilizes the barcode reader's illumination system to illuminate the substrate within the field of view such that the focusing lens focuses reflected illumination on the photo sensor array. Generally, when reading a barcode electronically displayed on a display screen the backlight illumination of the display screen is sufficient for the barcode reader to read the barcode and the focusing lens focuses illumination emitted by the backlight of the display screen onto the photo sensor array.

In many applications where barcode readers are used to collect data, the time at which a barcode is read is often recorded in association with the decoded data obtained from the barcode. Barcode readers which are useful in such applications often times have an internal real-time clock function which enables the barcode reader to maintain time and associate the time that a barcode is read with the decoded data obtained from the barcode.

A problem exists in that a barcode reader with a real-time clock function must periodically have the time value maintained by the clock set or reset. Such a requirement may exist, for example, if the clock is unable to maintain time when the barcode reader is powered off.

SUMMARY

The present disclosure provides a system and method for setting the time for an internal real-time clock function of a barcode reader and enabling the barcode reader to associate time, as determined by the internal real-time clock function, with decoded data from barcodes read during operator use of the barcode reader in the ordinary course of use (e.g. production barcodes) and delivery of the combination of production barcodes, with the time each is associated with, to a host system.

The method for setting an internal real-time clock function of a barcode reader may comprise: i) rendering a barcode clock which may be a 1D or 2D barcode which includes, encoded therein, a time; ii) reading the rendered barcode clock with a barcode reader which includes an internal real-time clock function; and iii) setting the time of the internal real-time clock function of the barcode reader to the time decoded from the barcode clock. The time represented by the time value may further include the date.

In the practice of this method the rendering of the barcode clock may comprise using an application operating on a computing device (e.g., a personal computer or a mobile device such as a mobile telephone or tablet) to render the barcode clock. More specifically, the application running on the computing device may encode the then current time at which the barcode clock is encoded or generated (as maintained by a real-time clock function of the computing device or as maintained by a trusted time server available to the application utilizing networking capabilities of the computing device) into the barcode clock and render an image of the encoded barcode clock on a display screen of the computing device. The barcode clock rendered on the display screen includes a time value representative of the then current time, which may include the then current date. Further, a new barcode clock may be encoded and rendered on the display screen periodically (e.g. 1 second intervals for example) to ensure that the time encoded in the barcode clock is current (to within the rendering period) and not stale.

Alternatively, the rendered barcode clock may be on paper or other substrate if the application operating on a mobile device or other computing device is capable of sending the rendered barcode to a printer.

The method may further include reading and extracting decoded data during use of the barcode reader by a user for a data collection application (i.e., reading production barcodes where the extracted decoded data is production data) after the internal real-time clock function has been set with the time based on the barcode including the time.

In this embodiment, the method may further include distinguishing between: i) a barcode such as the barcode clock that includes the time value encoded therein; and ii) a barcode that includes production data. The time for the internal real-time clock function of the barcode reader is set if the barcode includes the time value. When the barcode includes production data, the time (and date), as maintained by the internal real-time clock function, may be associated with the production data decoded from the barcode.

The method may further include outputting, to a host system, the production data and the time associated therewith (i.e. the time as maintained by the internal real-time clock function). The host system may store the combination of the production data and the time associated therewith in a database and/or use the combination as data for encoding into a new barcode for rendering on substrate (e.g. a scan to print application).

In another aspect the present disclosure describes a barcode reader which includes an imaging system capturing an image of a barcode within a field of view of the barcode reader.

The barcode reader may further comprise a processor executing a decoder stored in a computer-readable medium to: i) obtain decoded data from the image of a barcode within the field of view of the barcode reader, the decoded data representing a time value; and ii) set an internal real-time clock function of the barcode reader to a time corresponding to the time value.

In certain embodiments the processor may further distinguish between: i) a barcode such as the barcode clock that includes the time value encoded therein; and ii) a barcode that includes production data. The processor sets the time of the internal real-time clock function of the barcode reader when the barcode includes the time value encoded therein.

The processor may then associate the time, as maintained by the internal real-time clock function of the barcode reader, at which a production barcode is read with the production data decoded therefrom.

The processor may further output, to a host system, the production data and the time associated therewith (i.e., the time as maintained by the internal real-time clock function). The time represented by the time value may further include the date. Again, the host system may store the combination of the production data and the time associated therewith in a database and/or use the combination as data for encoding into a new barcode for rendering on substrate (e.g. a scan to print application).

The barcode reader may be part of a system. The system may comprise both the barcode reader and an application for rendering the barcode clock operating on a computing device or a mobile device such as a smart phone or tablet.

Rendering of the barcode clock may comprise using an application operating on a computing device or mobile device such as a mobile telephone or tablet to render the barcode clock. More specifically, the application may encode the then current time at which the barcode clock is encoded or generated (as maintained by a real-time clock function of the computing device or a mobile device or as maintained by a trusted time server available to the application utilizing networking capabilities of the mobile device) into a barcode and render an image of the encoded barcode clock on a display screen of the computing device or the mobile device. The barcode clock rendered on the display includes a time value representative of the then current time, which may include the then current date.

Further, a new barcode clock may be encoded and rendered on the display screen periodically (e.g. 1 second intervals for example) to ensure that the time encoded in the barcode clock is current (to within the rendering period) and not stale.

Alternatively, the rendered barcode clock may be on paper if the application operating on a mobile device or other computing device is capable of sending the rendered barcode to a printer.

In yet another aspect, this disclosure provides a barcode reader comprising an imaging system for capturing an image of a barcode within a field of view of the barcode reader.

The barcode reader may further include a processor for executing a decoder and other applications stored in a computer-readable medium to: i) obtain decoded data from each barcode within each image captured by the imaging system; ii) distinguish between a barcode such as the barcode clock which includes a time value encoded therein for setting an internal real-time clock function of the barcode reader and a barcode that includes data for transmission to a host system (e.g., production data); and iii) set the time of the internal real-time clock function of the barcode reader to a time corresponding to the time value if the barcode includes a time value.

The processor may further associate the time, as maintained by the internal real-time clock function of the barcode reader, at which a barcode is read with the production data decoded from the barcode.

The processor may further output, to a host system, the production data and the time associated therewith (i.e., the time as maintained by the internal real-time clock function). The time represented by the time value and maintained by the real-time clock function may include the date.

Again, the host system may store the combination of the production data and the time associated therewith in a database and/or use the combination as data for encoding into a new barcode for rendering on substrate (e.g. a scan to print application).

The barcode reader may be part of a system. The system may comprise both the barcode reader and an application operating on a computing device (including a mobile device such as a smart phone or tablet).

Rendering of the barcode clock may comprise using an application operating on a computing device to encode and render the barcode clock. More specifically, the application may encode the then current time at which the barcode clock is encoded or generated (as maintained by a real-time clock function of the computing device or as maintained by a trusted time server available to the application utilizing networking capabilities of the computing device) into a barcode and render an image of the encoded barcode clock on a display screen of the computing device. The barcode rendered on the display includes a time value representative of the then current time, which may include the then current date.

Again, a new barcode clock may be encoded and rendered on the display screen periodically (e.g. 1 second intervals for example) to ensure that the time encoded in the barcode clock is current (to within the rendering period) and not stale.

Alternatively, the rendered barcode clock may be on paper if the application operating on a mobile device or other computing device is capable of sending the rendered barcode to a printer.

The disclosure includes the features described herein, including the description, the annexed drawings, and the claims, which set forth in detail certain illustrative embodiments. These embodiments are indicative, however, of but a few of the various ways in which the principles of the disclosure may be employed.

BRIEF DESCRIPTION OF THE DRAWINGS

FIG. 2 depicts a block diagram of an exemplary computing device useful in the system in accordance with one embodiment.

FIG. 3 depicts a block diagram of an exemplary barcode reader which includes an internal real-time clock function useful in the system of FIG. 1 and which may have its time updated in accordance with embodiments disclosed herein.

DETAILED DESCRIPTION

The present disclosure provides a system and method for setting the time for an internal real-time clock function of a barcode reader and enabling the barcode reader to associate the time at which a barcode is read, as maintained and determined by the internal real-time clock function of the barcode reader, with decoded data from barcodes during operation use of the barcode reader to read barcodes in a production data collection application (i.e., reading production barcodes and decoding each production barcode to extract production data). The barcode reader may further provide for delivery to a host system, a combination of, for each production barcode, the production data decoded therefrom and the associated time (i.e., the time the production barcode is read as maintained and determined by the internal real-time clock function of the barcode reader).

Figure 1:
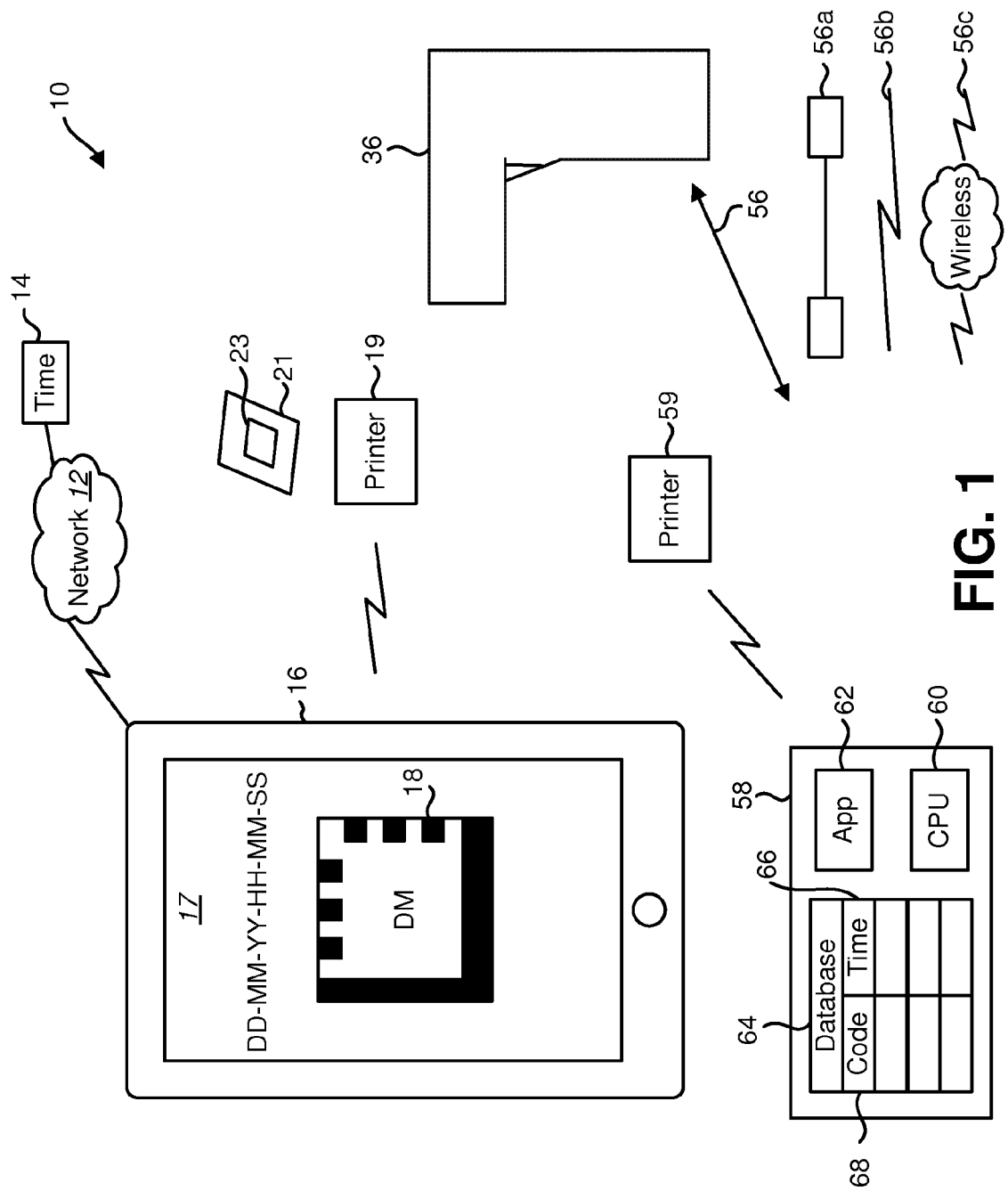
FIG. 1 depicts an example system for setting and updating the time tracked and maintained by an internal real-time clock function of a barcode reader in accordance with an exemplary embodiment.

FIG. 1 depicts an example system for setting and updating the time tracked and maintained by an internal real-time clock function of a barcode reader in accordance with one embodiment. The system 10 may include a computing device 16, a barcode reader 36, and a host system 58. The computing device 16 may be a mobile device as depicted or any other computing device such as a personal computer.

The host system 58 includes a processor 60 (e.g., a CPU), an application(s) 62, and may include a database 64. The host system 58 may further include, or be coupled to, a printer 59. The database 64 of the host system 58 may store a combination of barcode data 68 and a time (or time and date) 66 associated with the reading of the barcode by a barcode reader 36 that may be set by a trusted time server 14, which will be explained in more detail below.

The application(s) 62 may, in operation, store the combination of barcode data 68 and a time (or time and date) 66 associated with the reading of the barcode in the database 66. The application(s) 62 may in addition to, or in the alternative to storing the combination in the database 64, use the combination as to encode a new barcode or barcodes and render the new barcode(s) on a substrate by sending the encoded new barcode(s) to the printer 59 (e.g. a typical scan to print application).

In the system 10, the time tracked and maintained by an internal real-time clock function 44 of the barcode reader 36 is set and updated to enable the barcode reader 36 to accurately associate data read from a barcode (i.e., barcode data 68) with the time 66 at which the barcode is read. The system 10 may include a trusted time server 14, and the computing device 16 may be connected to the trusted time server 14 via a network 12.

Figure 5:
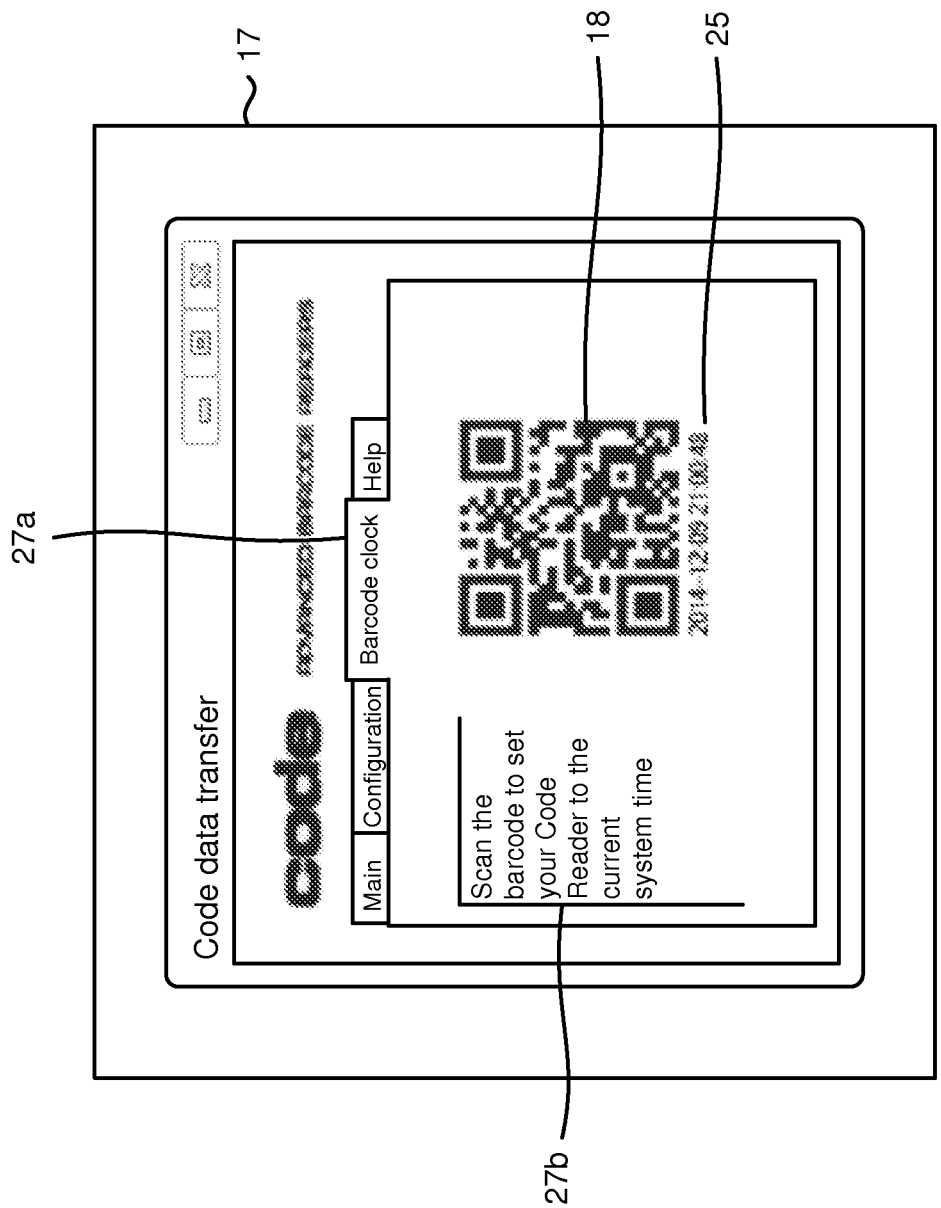
FIG. 5 depicts an alternative rendering of a barcode clock in accordance with an embodiment.

Referring to FIG. 1 in combination with FIG. 2 and FIG. 5, the computing device 16 may include a display screen 17, or alternatively include, or be coupled to, a printer 19. The computing device 16 is capable of: i) rendering a barcode clock 18 on the display screen 17; and/or ii) rendering a barcode clock 23 by printing on a paper or other substrate 21.

The computing device 16 may include an RTC application 22, other applications 24, and an operating system 20 operated by a processor 34. The operating system 20 may include a real-time clock function 26. The components of the computing device 16 may be powered by an internal battery 32.

The computing device 16 may include a network circuit 30 for connection with a trusted time server 14 via a communication network 12. The communication network 12 and the network circuit 30 may be compatible with any application network protocol including, but not limited to: Wideband Code Division Multiple Access (WCDMA), High Speed Packet Access (HSPA), cdma2000, Long Term Evolution (LTE), IEEE 802.16, IEEE 802.11, or the like.

The time tracked by the real-time clock function 26 of the computing device 16 may be, either periodically or non-periodically, verified and/or updated by obtaining time from the trusted time server 14 via a communication connection over the network 12.

The RTC application 22, when executed by the processor 34, may generate the barcode clock 18 and/or 23 for rendering on the display screen 17 or sending to the printer 19 for rendering on a paper or other substrate 21 by encoding the time, as tracked and maintained by the real-time clock function 26 of the computing device 16, into the barcode clock 18 and/or 23. Stated another way, the barcode clock 18 and/or 23 may include, in a machine-readable format, encoded therein by the computing device 16, the time, which may be the date and/or time, as tracked by the real-time clock function 26 (and previously obtained by, or contemporaneously obtained by, the computing device 16 from the trusted time server 14 via a communication connection over the network 12) at or about the time that the barcode clock 18 and/or 23 is encoded and generated for rendering.

In another embodiment, the barcode 18 and/or 23 may include, in a machine-readable format, encoded therein by the computing device 16, the time the barcode clock 18 and/or 23 is encoded, which may be the date and/or time as tracked by an internal real-time clock function 26 of the computing device.

In an alternative embodiment, the barcode clock 18 and/or 23 may originally be encoded and generated by the trusted time server 14 (i.e., the trusted time server 14 encodes the then current date and/or time into a barcode) and provided to the RTC application 22. In this alternative, the barcode clock 18 and/or 23 may be transferred to the computing device 16 from the trusted time server 14 via the network 12 for rendering on the display screen 17 or on a substrate 21 by a printer 19.

In these embodiments, a human recognizable rendering of the time (or date and time) 25 may be rendered with the barcode clock 18 and/or 23. The human recognizable rendering of the time (or date and time) would represent the same time (or date and time) encoded into the barcode clock 18 and/or 23 and enable an operator to verify that the time encoded in the barcode clock 18 and/or 23 is sufficiently recent for use setting the internal real-time clock of the barcode reader 36. Further, as shown in FIG. 5, the barcode clock 18 may be rendered with a human recognizable label or legend 27a, 27b indicating that the barcode is a barcode clock 18 and that it can be used to set the real-time clock of a barcode reader 36.

Referring to FIG. 1 in combination with FIG. 3, the system 10 may further comprise a barcode reader 36, which will be described in more detail herein. The barcode reader 36 is capable of setting, verifying, and/or updating the time 45 tracked and maintained by its internal real-time clock function 44 by reading and decoding the barcode 18 and/or 23 to obtain the time encoded therein (e.g., the time encoded by the computing device 16 or the trusted time server 14).

Consistent with the system 10, the barcode reader 36 may include a communication interface 50 for coupling to the host system 58 via a communication connection 56. The communication interface 50 may be compatible with the communication connection 56 and may include at least one of: i) a serial communication interface 50a in which the communication connection 56 may be a hard-wired communication connection 56a utilizing a serial communication protocol such as Universal Serial Bus (USB) or other serial communication protocol (e.g., universal asynchronous receiver/transmitter, or UART); ii) a point-to-point communication interface 50b in which the communication connection 56 may be a point-to-point wireless connection 56b utilizing a protocol such as Bluetooth®, IEEE 802.11, or any other point-to-point wireless communication protocol; or iii) a network communication interface 50c in which the communication connection 56 may be a wireless network connection 56c utilizing a protocol such as Wideband Code Division Multiple Access (WCDMA), High Speed Packet Access (HSPA), cdma2000, Long Term Evolution (LTE), IEEE 802.16, or the like.

When the communication connection 56 is established the barcode reader 36 may provide to the host system 58, via the communication connection 56, a combination of decoded barcode data and the time (or date and time), that the barcode containing the data was read by the barcode reader 36. The time, or date and time, provided to the host system 58 is the time, or date and time, tracked by the internal real-time clock function 44 of the barcode reader as set, verified, and updated as described herein.

The host system 58 may include a processor (e.g., a CPU) 60 which executes an application 62 stored in a non-transient computer-readable medium (not shown). The application 62, when executed by the CPU 60, receives the decoded data and associated time (or date and time) from the barcode reader 36 via the communication connection 56 and may: i) write the decoded data (e.g., barcode data 68) to the database 64 in association with the time (or date and time) 66; and/or ii) encode a new barcode or barcodes using the barcode data 68 and the associated time (or date and time 66) and render the new barcode(s) on a substrate by sending the encoded new barcode(s) to the printer 59 (e.g. a typical scan to print application).

The barcode reader 36 further includes a focusing lens 41 focusing an image of a field of view 47 onto a photo sensor array. The barcode reader 36 includes a non-transient computer-readable medium (not shown) that stores an operating kernel 42, a decoder 46, and an application 48. The operating kernel 42 may include the barcode reader's internal real-time clock function 44 which tracks and maintains the time (or the time and date) 45. A processor 40 coupled to the non-transient computer-readable medium operates each of the kernel 42, the decoder 46 and the application 48. The application 48 interfaces with the host system 58 via the communication connection 56. The components of the barcode reader 36 may be powered by an internal battery 32.

Figure 4:
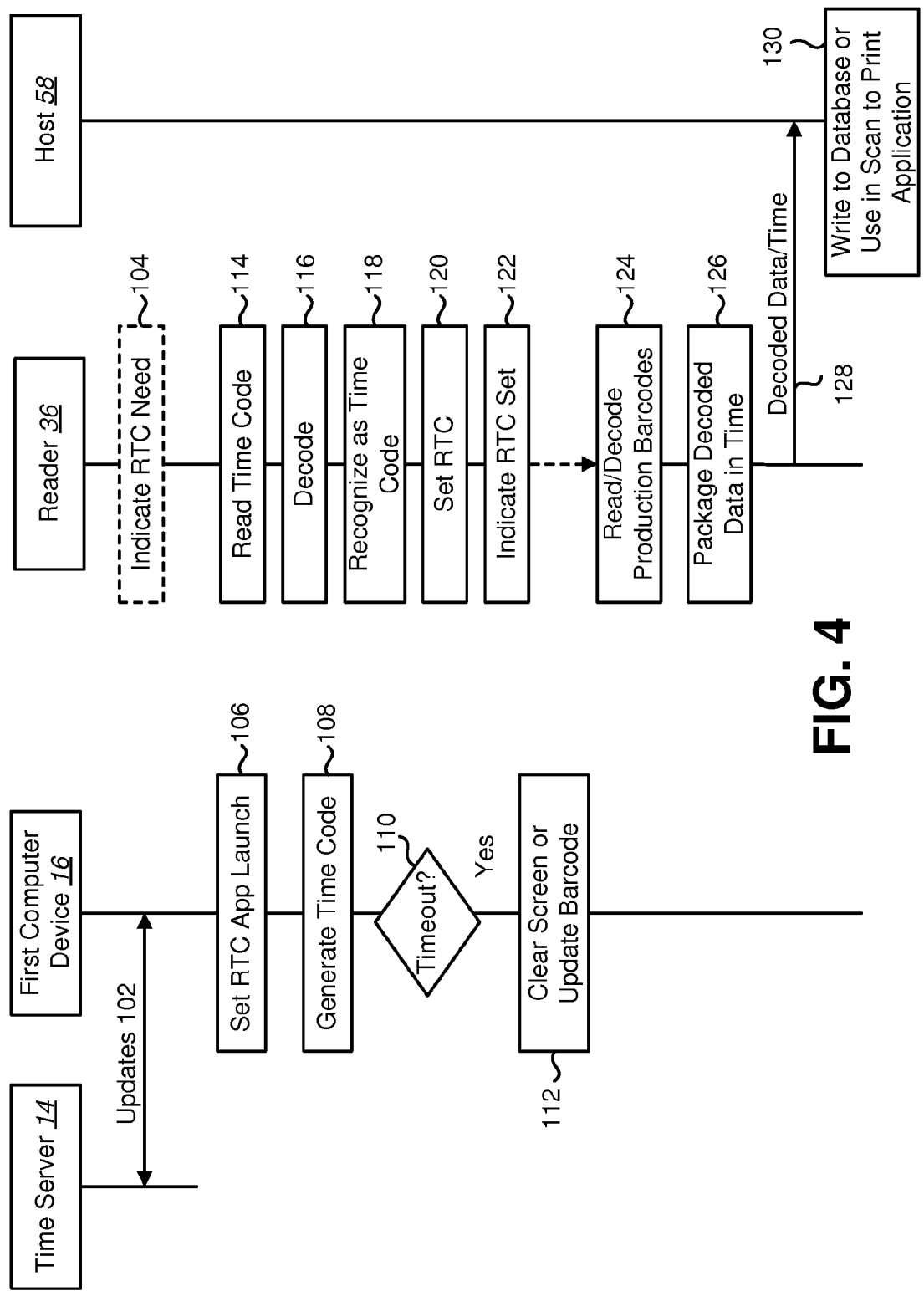
FIG. 4 depicts a flow diagram of an exemplary operation process of the system of FIG. 1.

FIG. 4 depicts a flow diagram of an exemplary operation process of the system 10. The operating process of the system 10 will be explained with reference to FIG. 4 in conjunction with FIGS. 1, 2, 3, and 5. In step 102, the operating system 20 of the computing device 16 obtains updates. More specifically, the operating system 20 of the computing device 16 obtains the time (or the time and date) from the trusted time server 14 on a periodic or non-periodic basis to maintain the accuracy of the time tracked by the real-time clock function 26 of the computing device 16. The time and/or date may be obtained from the trusted time server 14 utilizing the network circuit 30 of the computing device 16 over the network 12.

The barcode reader 36 may indicate 104 that the time 45 tracked by the real-time clock function 44 of the barcode reader 36 requires updating. This indication may be audio or visual (e.g., illumination lights) and may be based on the operating kernel 42 determining that the time 45 is incorrect. For example, upon power up, the kernel 42 may be programmed to obtain an updated time. Alternatively, the user may simply know that upon power up of the barcode reader 36, the time 45 is incorrect and may initiate the update of the time and/or date. In other embodiments, the application 48 running on the barcode reader 36 may not transfer data to the host system 58 if the time 45 is incorrect and may indicate the need for an update to the user by visual or audio indication.

After the user knows the time 45 maintained by the internal real-time clock function 44 of the barcode reader 36 requires updating, the user may launch the RTC application 22 on the computing device 16 at step 106. Alternatively, the RTC application 22 may be launched autonomously.

The barcode clock 18 and/or 23 is generated (or obtained) and rendered at step 108 by any of: i) the RTC application 22 encoding the time tracked and maintained by the real-time clock function 26 of the computing device 16; ii) the RTC application 22 obtaining time tracked and maintained by the trusted time server 14 (via the network 12) and encoding that time; or iii) the RTC application 22 obtaining from the trusted time server 14 (via the network 12) a barcode clock 18 and/or 23 which includes encoded therein the time tracked and maintained by the trusted time server 14.

It is determined whether a time out occurs (i.e., a time out function) (110). For example, in the event that the barcode clock 18 is rendered on the display of the computing device 16, since the time encoded in the rendered barcode clock 18 is not changing with the passage of time, if it is not used promptly to set the time of the internal real-time clock function of the barcode reader 36 it becomes obsolete because, if used, the set time of the internal real-time clock function of the barcode reader 36 will be incorrect. If it is determined that a time out has occurred, after passage of a predetermined period of time represented by the time out function, the RTC application 22 may either: i) clear the screen, leaving no barcode clock 18 for reading; and/or ii) update the barcode clock 18 with the then correct time which may include generating a new barcode clock 18 with the new time and rendering the new barcode (112).

It should be appreciated that if the time out is set to a short duration (e.g. 1 second for example) and a new barcode clock 18 is rendered by the computing device 16 after the short duration of time it may appear to a user that the barcode clock 18 (and the human recognizable rendering of the time or date and time) 25) is continuously changing to reflect the passage of time. Stated another way, the RTC application 22 of the computing device 16 may render a sequence of barcode as the barcode clock 18 on the display screen 17 such that each barcode of the barcode clock 18 of the sequence is rendered for only a short duration of time.

The barcode reader 36 may read the barcode clock 18 and/or 23 by placing the barcode clock 18 and/or 23 within the field of view 47 of the barcode reader 36 and triggering a read (114).

The processor 40 of the barcode reader 36 operates the decoder 46 to process the image captured by the photo sensor 43 and extracts decoded data from the barcode (116).

The kernel 42 may obtain the decoded data from the decoder 46 and recognize the decoded data as a time code (versus production data) (118). Recognition of the time code may be by way of the barcode being of a distinct format (i.e., different from the format of production data) or having distinct leading or trailing characters used for the kernel 42 to recognize as a control code or time code to be used by the barcode reader 36 instead of being transferred to the host system 58.

The kernel 42 may set the time 45 of the internal real-time clock function 44 to the time decoded from the barcode clock 18 and/or 23 (120).

The kernel 42 may provide an indication to the user that the time 45 has been set or updated (122). The indication may be audio (e.g., via a speaker), tactile (e.g., via a vibration motor), or visual (e.g., via an indicator light).

The barcode reader 36 reads and decodes production barcodes (124). The decoded data of the production barcodes may be transferred to the host system 58, for example, in the ordinary course of production. The decoded data of the production barcode may be packaged with the time that the production barcode is read and decoded by the barcode reader 36 (126).

The decoded data of the production barcode and the associated time may be transferred to the host system 58 via the communication connection 56 (128). The CPU 60 of the host system 58 may execute the application 62, at step 130, to write the decoded data and the associated time to the database 64 and/or use the decoded data and associated time to encode one or more new barcodes for printing by printer 59 in a scan to print application.

It should be appreciated that because the time 45 set or updated in accordance with the embodiments disclosed herein may originate from the trusted time server 14, the associated time written to the database 64 of the host system 58 (or used by the host system 28 for a new barcode(s) in a scan to print application) may be the time maintained and tracked by the trusted time server 14 and each intermediary real-time clock system including the real-time clock function 26 of the computing device 16 and the internal real-time clock function 44 of the barcode reader 36.

The scope of the claims is not limited to the specific implementations or embodiments described above. Various modifications, changes and variations may be made in the arrangement, operation and details of the implementations described herein without departing from the scope of the claims.

What is claimed is:

1. A barcode reader comprising:
    an imaging system for capturing an image of a barcode within a field of view of the barcode reader, wherein the barcode reader is part of a system, the system comprising the barcode reader and an application operating on a computing device, wherein the application is configured to render the image of the barcode on a display screen of the computing device; and
    a processor configured to:
        obtain decoded data from the image of the barcode, the decoded data representing a time value, wherein the time value represents a current time at which the barcode is generated; and
        set an internal clock function of the barcode reader to a time corresponding to the time value.

2. The barcode reader of claim 1, wherein the processor is further configured to:
    distinguish between: i) a barcode that includes the time value; and ii) a barcode that includes production data;
    set the internal clock function of the barcode reader if the barcode includes the time value; and
    associate time, as maintained by the internal clock function, with production data from a barcode that includes production data.

3. The barcode reader of claim 2, wherein the processor is further configured to output, to a host system, the production data and the associated time as maintained by the internal clock function.

4. The barcode reader of claim 1, wherein the time represented by the time value further includes a date.

5. A barcode reader comprising:
    an imaging system for capturing an image of a barcode within a field of view of the barcode reader, wherein the barcode reader is part of a system, the system comprising the barcode reader and an application operating on a computing device, wherein the application is configured to render the image of the barcode on a display screen of the computing device, and wherein the barcode includes a time value representing a current time at which the barcode is generated; and
    a processor configured to:
        decode each barcode within each image captured by the imaging system;
        distinguish between a barcode which includes a time value for setting an internal clock function of the barcode reader and a barcode that includes production data for transmission to a host system; and
        set the internal clock function of the barcode reader to a time corresponding to the time value if the barcode includes the time value.

6. The barcode reader of claim 5, wherein the processor is further configured to associate time, as maintained by the internal clock function, with production data from a barcode that includes the production data.

7. The barcode reader of claim 6, wherein the processor is further configured to output, to the host system, the production data and the associated time as maintained by the internal clock function.

8. The barcode reader of claim 5, wherein the time represented by the time value further includes a date.

9. A method for setting a clock function of a barcode reader, the method comprising:
    rendering a barcode which includes, encoded therein, a time value, wherein rendering the barcode comprises using an application operating on a computing device, wherein the application is configured to render an image of the barcode on a display screen of the computing device, and wherein the time value represents a current time at which the barcode is generated;
    reading the barcode with a barcode reader which includes an internal clock function; and
    setting the internal clock function of the barcode reader to a time corresponding to the time value decoded from the barcode.

10. The method of claim 9, further comprising:
    reading a production barcode which includes production data; and
    associating time, as maintained by the internal clock function at the time the production barcode is read, with the production data.

11. The method of claim 10, further comprising outputting, to a host system, the production data and the associated time as maintained by the internal clock function.

12. The method of claim 9, wherein the time represented by the time value further includes a date.

13. The method of claim 9, further comprising:
    reading a production barcode which includes production data; and
    associating time, as maintained by the internal clock function at the time the production barcode is read, with the production data.

14. The method of claim 13, further comprising outputting, to a host system, the production data and the associated time as maintained by the internal clock function.

15. The method of claim 9, wherein the time represented by the time value further includes a date.

* * * * *